United States Patent Office 3,462,475
Patented Aug. 19, 1969

3,462,475
α-CYANO-β-ALKYL SUBSTITUTED
CINNAMIC ACID AMIDES
Albert F. Strobel, Delmar, and Sigmund C. Catino, Castleton, N.Y., assignors to GAF Corporation, New York, N.Y., a corporation of Delaware
No Drawing. Continuation-in-part of application Ser. No. 99,030, Mar. 29, 1961. This application Oct. 23, 1965, Ser. No. 504,220
Int. Cl. C07c 121/40, 103/58
U.S. Cl. 260—465　　　　　9 Claims This application is a continuation-in-part of application Ser. No. 99,030 filed Mar. 29, 1961 and now abandoned.

This invention relates to new and useful α-cyano-β-alkyl substituted cinnamic derivatives and for processes for preparing same, and in particular to certain specific derivatives of the ester, amide and substituted amide types.

Various organic compounds exhibit the power to absorb electromagnetic radiations within the band of 2900 to 3700 A. and when incorporated in various plastic materials such as transparent sheets, the resultant sheet acts as a filter for all of the radiation passing through and will transmit only such radiations as are not absorbed by the sheet and/or the absorbing agent. It is thus possible to screen out undersirable radiations and utilize the resulting transparent sheet as a filter in many technical and commercial applications such as wrappings for food products and the like.

Numerous organic compounds have been suggested as absorbents for the range of radiations described above, which range is designated as the ultra-violet range. Such uses include incorporation in plastic sheet materials and the stabilization in general of transparent plastics bodies. By far, the greatest concern with respect to ultra-violet radiations is with those radiations which come from the sun. Most of these radiations have wave lengths between 250 and 400 millimicrons. The effects of such radiation on the human skin, producing sunburn and suntan, are of course well known. Other effects, however, of great commercial importance relate to the photochemical degradation caused by ultra-violet radiations. Many commercial products are either unstable when subjected to such radiations, or are affected to the extent that they become undesirable or unsalable. Many plastic materials, when exposed to this radiation, undergo substantial degradation resulting in the development of undesirable color bodies and subsequent loss of transparency. Food products, in addition to becoming discolored, often become unfit for human consumption. Thus, prolonged exposure of fruits, edible oils, butter and other prepared foods will spoil and turn rancid on exposure to ultra-violet light. It is well known that colored objects such as dyed textiles will fade on exposure to sunlight, and in particular to ultra-violet light. Many plastics, in addition to developing color formation and reduction in transparency, become brittle, lose their elasticity, crack and eventually completely deteriorate on exposure to sunlight. Paints, varnishes, lacquers and the like also are prone to these effects, even though here the transparency program may not be paramount.

We have discovered a class of compounds which are not only compatible with a great number of film-forming plastics, resins, gums, waxes and the like, but which, further, exhibit outstanding ultra-violet absorbing properties within the ultra-violet region close to the visible spectrum, namely, in the wave length region of 3000 to 3600 A. The compounds of this invention, even though they exhibit outstanding absorbing properties close to the visible region of the electromagnetic field, nevertheless are essentially colorless compounds and can be employed with the assurance that they will not contribute to color in normally colorless formulations, nor will they affect the color of a colored formulation such as a paint film or a dyed textile.

It is therefore an object of the present invention to provide new and useful compounds characterized by outstanding ultra-violet absorbing properties.

It is a further object of this invention to provide new and useful esters, amides, and substituted amides of α-cyano-β-alkyl cinnamic acids.

It is a still further object of this invention to provide new and useful esters, amides, and substituted amides of α-cyano-β-alkyl cinnamic acids which exhibit outstanding ultra-violet absorbing properties.

It is another object of this invention to provide processes for the preparation of new and useful ultra-violet absorbing compounds.

It is still another object of this invention to provide processes for the preparation of new and useful esters, amides and substituted amides of α-cyano-β-alkyl cinnamic acids.

Other objects and advantages will appear hereinafter as the description proceeds.

The new and useful compounds of this invention are characterized by the following general formula:

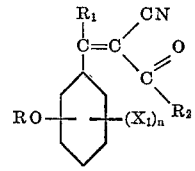

wherein $n$ may be 0 to 4, R may be hydrogen, alkyl, alkenyl, aryl containing not more than three rings, substituted alkyl (e.g., hydroxyalkyl, haloalkyl, cyanoalkyl, alkoxyalkyl, aryloxyalkyl, hydroxyalkoxyalkyl, carbalkoxyalkyl), substituted aryl containing not more than three rings (e.g., halophenyl, halonaphthyl, cyanophenyl, alkylphenyl, i.e., methylphenyl (tolyl, xylyl, etc.), ethylphenyl, n-propyl phenyl, cyanonaphthyl, alkyl naphthyl, alkoxy phenyl, alkoxy naphthyl, hydroxyalkoxy phenyl, carbalkoxyphenyl, alkoxyalkyl phenyl, carbalkoxynaphthyl, etc., $R_1$ may be alkyl of 1–30 carbon atoms or alkenyl of 3–30 carbon atoms, $R_2$ may be aryloxy, aralkoxy

($Y_1$ and $Y_2$ may be any of the R substituents), and when $R_2$ is aryloxy or aralkoxy, RO is ortho-para, and when $R_2$ is

RO may also be meta; $X_1$ is any substituent which does not have an auxochromic effect and its bathochromism is less than 250 A. Since the utility of the subject compounds is dependent in the main upon a lack of color, any grouping or substituent which increases the wavelength of the peak absorption point more than 250 A. is to be avoided since this will shift such absorption into the visible region, that is, beginning at about 3600 to 4000 A. The groupings to be specifically avoided, therefore, as substituents for $X_1$ are nitro (often classified as a chromophore but for the purpose of this categorization, auxochromic or bathochromic is definitive), oxy, i.e., —O—, amino, (—N), azo, azoxy, etc. All other groupings are satisfactory although some may have a bathochromic effect but nevertheless not as much as 250 A. Such substituents as suitable include:

halo (e.g., —Cl, —F, —Br, —I)
alkyl (e.g., alkyl of 1 to 30 carbons)
aryl (e.g., phenyl, tolyl, xylyl, naphthyl, acenaphthyl, phenanthryl, anthraquinonyl, etc.)
alkylsulfonyl (alkyl of 1 to 30 carbons)
carbalkoxy (—COOR$_3$ where R$_3$ is alkyl of 1 to 30 carbons)
carbaryloxy (COOAr where Ar is aryl, e.g., phenyl, naphthyl, acenaphthyl and substituted derivatives such as alkylaryls, cyanoaryl, haloaryl, carbalkoxyaryl, alkylsulfonyl aryl and the like)
—OSO$_2$R$_4$ (wherein R$_4$ is alkyl or aryl or substituted forms as above)

(where R$_5$ is alkyl or aryl or substituted forms as above) and substituted alkyl and aryl (simularly as R)

As examples of specific R substituents, there may be employed:

alkyl
    methyl
    ethyl
    n-propyl
    n-butyl
    iso-butyl
    tertiary-butyl
    secondary-butyl
    n-amyl
    iso-amyl
    tertiary-amyl and the other isomeric amyls
    n-hexyl
    iso-hexyl and the other isomeric hexyls
    n-heptyl
    iso-heptyl and the other isomeric heptyls
    n-primary nonyl (nonyl-1)
        nonyl-(2)
        nonyl-(3)
        nonyl-(5)
    2-methyl-octyl-2
    4-ethyl-heptyl-4
    2-methyl-4-ethyl-hexyl-4
    n-primaryl octyl
        octyl-(2) (capyryl)
    2-methyl-3-ethyl-pentyl-3
    2,2,4-trimethyl-pentyl-4
    2-ethyl-hexyl-1
    3-ethyl-hexyl-3
    2-methyl-heptyl-2
    3-methyl-heptyl-3
    4-methyl-heptyl-4
    n-primary decyl (decyl-1)
    decyl-4 (secondary decyl)
    2-ethyl-octyl-3 (tertiary decyl)
    4-propyl-heptyl-4 (tertiary decyl)
    undecyl-1 (n-primary decyl)
    undecyl-2 (n-secondary decyl)
    dodecyl-1 (n-dodecyl)
    tridecyl-1 (n-tridecyl)
    tridecyl-7
    3-ethyl-undecyl
    tetradecyl-1 (n-tetradecyl)
    pentadecyl-1 (n-pentadecyl)
    pentadecyl-8
    hexadecyl (cetyl)
    heptadecyl-9
    octadecyl-1
    2-ethyl heptadecyl-2
    2-methyl heptadecyl-2
    eicosyl-1
    docosyl-1
    tricosyl-12
    tertacosyl
    tricapryl
    pentacosyl
    hexacosyl
    heptacosyl
    octacosyl
    nonacosyl
    myrisyl (30 carbons)
alkenyl
    allyl (CH$_2$=CHCH$_2$—)
    methallyl (CH$_2$=C(CH$_3$)CH$_2$—)
    crotyl (CH$_3$CH=CHCHCH$_2$—)
    butenyl-1

$$(CH_2=CH-\underset{|}{CH}-CH_3)$$

butenyl-1
    pentenyl-1
    γ-isopropyl allyl
    β-ethyl-γ-propyl allyl
    2-methyl-octenyl-6
    decenyl-1
    decenyl-2
    undecenyl
    dodecenyl-2
    octadecenyl
    docosenyl
    pentamethyl eicosenyl
aryl
    phenyl
    tolyl
    xylyl
    cumyl
    α-naphthyl
    β-naphthyl
    acenaphthyl
    α-anthraquinonyl
    β-anthraquinonyl
    γ-anthraquinonyl
    phenanthranyl
    diphenyl and the alkyl substituted derivatives thereof
    Substituted alkyls, e.g.,
    cyanoethyl
    cyanopropyl (n)
    cyanoisopropyl
    cyanobutyl (h)
    cyanoisobutyl
    cyanoamyl (n)
    cyanoisoamyl
    cyanohexyl
    cyanoheptyl
    cyanononyl
    cyanodecyl
    cyanolauryl, and the like
    hydroxyethyl
    hydroxypropyl (n-propyl, isopropyl)
    hydroxybutyl (n-butyl, isobutyl, etc.)
    hydroxyamyl
    hydroxyhexyl
    hydroxydecyl
    hydroxylauryl, and the like
    chloroethyl
    chloropropyl (n-propyl, isopropyl)
    chlorobutyl (n-butyl, isobutyl, etc.)
    chloroamyl
    chlorohexyl
    chlorodecyl
    chlorolauryl, and the like
    bromoethyl
    bromopropyl (n-propyl, isopropyl)
    bromobutyl (n-butyl, isobutyl, etc.)
    bromoamyl bromohexyl
bromodecyl
bromolauryl, and the like
methoxyethyl
methoxypropyl (n-propyl, isopropyl)
methoxybutyl (n-butyl, isobutyl, etc.)
methoxyamyl
methoxyhexyl
methoxydecyl
methoxylauryl, and the like
ethoxyethyl
ethoxypropyl (n-propyl, isopropyl)
ethoxybutyl (n-butyl, isobutyl, etc.)
ethoxyamyl
ethoxyhexyl
ethoxydecyl
ethoxylauryl, and the like.
carbomethoxy ethyl
carbomethoxy propyl
carbomethoxy butyl
carbomethoy amyl
carbomethoxy hexyl, etc.
carbethoxyethyl
carbethoxypropyl
carbethoxybutyl
carbethoxyamyl
carbethoxyhexyl, etc.
carbopropoxyethyl
carbopropoxypropyl
carbopropoxybutyl
carbopropoxyamyl
carbopropoxyhexyl, etc.
carbobutoxyethyl
carbobutoxypropyl
carbobutoxybutyl
carbobutoxyamyl
carbobutoxyhexyl, etc.
phenoxymethyl
phenoxyethyl
phenoxypropyl
phenoxybutyl
phenoxyamyl
phenoxyhexyl, etc.
toloxymethyl
toloxyethyl
toloxypropyl
toloxybutyl
toloxyamyl
toloxyhexyl, etc.
xyloxymethyl
xyloxyethyl
xyloxypropyl
xyloxybutyl
xyloxyamyl
xyloxyhexyl, etc.
hydroxyethoxyethyl
hydroxyethoxypropyl
hydroxyethoxybutyl
hydroxyethoxyamyl, etc.
hydroxypropoxyethyl
hydroxypropoxypropyl
hydroxypropoxybutyl
hydroxypropoxyamyl, etc.
hydroxybutoxyethyl
hydroxybutoxypropyl
hydroxybutoxybutyl
hydroxybutoxyamyl, etc.

substituted aryl anisole
penetole
p-diethoxyphenyl
l-methoxy phenanthryl
α-naphthylmethylether
β-naphthylmethylether
α-naphthylethylether
β-naphthylethylether
hydroxyethyl phenyl
hydroxypropyl phenyl
chlorophenyl
bromophenyl
1,2-dichlorophenyl
1,3-dichlorophenyl
1,3,5-trichlorophenyl
1,2-dibromophenyl
o-chlorotolyl
m-chlorotolyl
m-bromotolyl
bromo-o-xylyl
α,β-dichloro naphthyl
4-bromoacenaphthyl
carboxyphenyl
carboxytolyls
carboxyxylyls
carbalkoxylphenyls, e.g.,
    carbomethoxylphenyl
    carboethoxylphenyl
carbalkoxytolyls, e.g.,
    carbomethoxytolyls
acetophenyl
propiophenyl
butyrophenyl
lauroylphenyl
stearoylphenyl
p-acetotolyl
o-acetotolyl
α-benzoyl naphthyl
β-benzoyl naphthyl
acetaminophenyl
acet-methylamino phenyl
o-acetoaminotolyl
p-acetoaminotolyl
α-acetoaminonaphthyl
β-acetoaminonaphthyl
propio-aminophenyl
butyro-aminophenyl
o-propio-aminotolyl
p-propio-aminotolyl
o-butyroaminotolyl
p-butyroaminotolyl
o-lauroylaminotolyl
p-lauroylaminotolyl
o-stearolylaminotolyl
p-stearolylaminotolyl
sulfamyl phenyl
sulfamyl naphthyl substituted alkenyls 2-chloroallyl
3-chloroallyl
3,3-dichloroallyl
2,3-dichloroallyl
2'-bromoallyl
2-iodoallyl
1-chlorobutenyl-(1)
2-chlorobutenyl-(1)
4-chlorobutenyl-(1)
4-bromobutenyl-(1)
2-chloro-4-bromobutenyl-(1)
1,2-dichloro-4-bromobutenyl-(1)
1,4-dibromobutenyl-(1)
2,4-dibromobutenyl-(1)
2-chlorcrotyl
3-chlorcrotyl
4-chlorcrotyl
2,4-dichlorocrotyl
1,2-bromocrotyl
3,-chloromethallyl
3,3-dichloromethallyl
1,2-dibromopentenyl-(1)
2,3-dibromoheptenyl-(2)

$R_1$ may be any of the alkyl of 1–30 carbon atoms or alkenyl radicals of 3 to 30 carbon atoms described above as suitable for an R substituent. As suitable specific $R_2$ substituents, one may employ any aryl moiety (sub- or unsub-)connected to the oxy group of the ester compounds, e.g., phenoxy
toluoxy
xyloxy
naphthoxy
alkoxyaryloxy, e.g.,
    ethoxyphenoxy
    1-methoxyphenanthroxy
hydroxyalkylaryloxys, e.g.,
    hydroxyethylphenoxy
    hydroxyethylnaphthoxy
haloaryloxy, e.g.,
    chlorophenoxy
    bromophenoxy
    1,2-dichlorophenoxy
    o-chlorotoluoxy
    m-bromotoluoxy
    $\alpha,\beta$-dichloronaphthoxy
carboxyaryloxy, e.g.,
    carboxyphenoxy
    carboxytoluoxy
    carboxyxyloxy, etc.
acylaryloxys, e.g.,
    acetophenoxy
    propiophenoxy
sulfamylphenoxy
monoalkylsulfamylphenoxy
dialkylsulfamylphenoxy, and the like In addition, as defined above, $R_2$ may also be aryloxy, e.g.

benzyloxy
phenethoxy
phenyl n-propoxy
phenyl iso-propoxy
phenyl iso-butoxy
p-isopropyl benzyloxy
phenyl isoamoxy
2,4-dimethyl benzyloxy
2-methyl benzyloxy
3-methyl benzyloxy
4-methyl benzyloxy
3,5-dimethyl benzyloxy
2,4,5-trimethyl benzyloxy
3,4,5-trimethyl benzyloxy, and still further, $R_2$ may be amino whereby the resulting compounds are amides or substituted amides. As $Y_1$ and $Y_2$ substituents to form the N,N'-di-substituted amides one may select any of the R substituents, either the same or different.

In addition to the above contemplated derivatives, polyoxylkylated derivatives thereof are within the purview of this invention. Any of the aforementioned derivatives containing at least one reactive hydrogen atom may be reacted with an alkylene oxide or a compound functioning as an oxide such as ethylene oxide, propylene oxide, butylene oxide, butylene dioxide, cyclohexane oxide, glycidol, epichlorohydrin, butadiene dioxide, isobutylene oxide, styrene oxide and mixtures thereof, and the like to yield the corresponding polyoxyalkylated product. Among the types of compounds which are reactive in this manner are the following:

alcohols
amides
substituted amides and the like.

From one to about 100 moles of oxyalkylating agent may be condensed with the said alcohols and amides.

In preparing the polyoxyalkylated derivatives of the above types, it is necessary to prevent interaction of the phenolic hydroxyl group of the phenone moiety from entering into this reaction. This may be accomplished by esterifying the said hydroxyl group with benzene sulfonyl chloride and then regenerating it by hydrolysis after the cyanocinnamate has been prepared.

Some specific ketones are:

2'-hydroxyacetophenone (2-hydroxyacetophenone)
4'-hydroxyacetophenone (4-hydroxyacetophenone)
4-methoxyacetophenone
4-ethoxyacetophenone
4-N-propoxyacetophenone
2'-alloxy-5'-bromoacetophenone
2-bromo-4'-methoxyacetophenone
2'-alyloxybutyrophenone
4'-butoxy-2'-methylbutyrophenone
3'-bromo-4'-methoxybutyrophenone
3'-chloro-4'-ethoxybutyrophenone
2',5'-dimethyl-4'-propoxybutyrophenone
4'-ethoxy-3'-methylbutyrophenone
4'-ethyl-2'-hydroxy-6'-methylbutyrophenone
2'-isopentyloxy-5'-methylbutyrophenone
2'-methyl-4'-propoxybutyrophenone
4'-methoxy-3'-phenylbutyrophenone
2'-hydroxy-5'-methyloctanophenone
4-N-dodecyloxyacetophenone
4-benzyloxyacetophenone
4'-phenoxyacetophenone
2',3'-dimethyl-4'-hydroxyacetophenone
3'-bromo-4'-hydroxyacetophenone
3'-bromo-5'-fluoro-2'-hydroxyacetophenone
3'-allyl-4'-hydroxyacetophenone
3'-allyl-2'-hydroxyacetophenone
3'-allyl-2'-hydroxy-5'-methylacetophenone
5'-ethyl-2'-hydroxybutyrophenone
4'-hydroxyoctanophenone
4'-hydroxyhexadecaphenone
5'-methyl-2'-(p-tolyloxy)acetophenone
4'-(p-hydroxyphenoxy)acetophenone
2'-hydroxy-4'-pentadecylacetophenone
2'-hydroxy-3'-methylacetophenone
2'-hydroxy-4'-methylacetophenone
2'-hydroxy-5'-methylacetophenone
3'-hydroxy-4',5'-dimethylacetophenone
3',5'-dibromo-4'-hydroxymethylbutyrophenone
2'-hydroxycrotonophenone
3'-hydroxycrotonophenone
4'-ethoxy-$\beta$-methylcrotonophenone
2'-hydroxypentenophenone
5'-chloro-2'-hydroxycrotonophenone
4'-methoxy-3-methyl-2-pentenophenone
4'-methoxy-2-hexenophenone
3'-tert.butyl-3'-chloro-2'-hydroxypentenophenone
2'-hydroxy-4',5'-dimethylpentenophenone
2'-methoxy-4-heptenophenone
2'-methoxy-6-heptenophenone
2'-methoxy-2-octenophenone The following examples will serve to illustrate the present invention without being deemed limitative thereof.

Example 1

Preparation of $\alpha$-cyano-$\beta$-methyl-2-hydroxycinnamic acid N,N-dimethylamide:

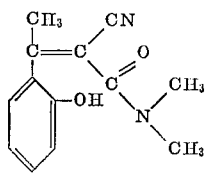

Into a 500 ml. flask fitted with a stirrer, thermometer, reflux condenser, water trap and heating mantle, there are charged:

| | | |
|---|---|---|
| 2-hydroxyacetophenone | mol | 0.25 |
| α-Cyano-N,N-dimethylacetamide | do | 0.25 |
| Ammonium acetate | g | 3.85 |
| Glacial acetic acid | ccs | 12 |
| Benzene | ccs | 175 |

The charge is stirred for 8 hours at reflux and then the benzene is distilled. The residue is diluted with 130 mls. water and filtered. The solid residue is slurried in 85 mls. of water and filtered again. The residue is then distilled under a high vacuum of 0.6 mm. to remove volatile impurities. The residue is fairly pure product.

Example 2

Preparation of α-cyano-β-methyl-4-hydroxycinnamic acid amide:

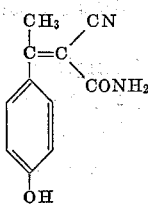

The procedure of Example 1 is repeated except that corresponding equivalent amounts of 4-hydroxyacetophenone and α-cyanoacetamide are condensed.

Example 3

Preparation of α-cyano-β-methyl-4-hydroxycinnamic acid phenyl ester:

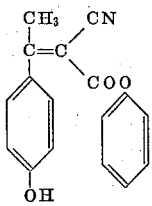

This compound is prepared in a manner similar to that described in Example 1 employing equivalent amounts of phenyl α-cyanoacetate and 4-hydroxyacetophenone as reactants.

Example 4

Preparation of α-cyano-β-methyl-4-hydroxycinnamic acid benzyl ester:

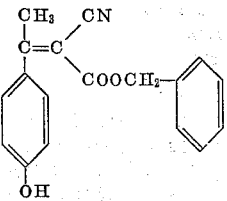

This compound is prepared in the manner described in Example 1 by the condensation of equimolar amounts of benzyl α-cyanoacetate with 4-hydroxyacetophenone.

Example 5

Preparation of α-cyano-β-methyl-4-methoxycinnamic acid N,N-dimethyl amide:

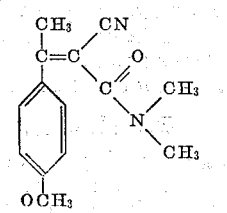

This compound is made in the manner described in Example 1 except that an equivalent amount of 4-methoxyacetophenone is used in lieu of 2-hydroxyacetophenone of that example.

In the following examples 2-hydroxyacetophenone is condensed with the designated cyanoacetate compound in the manner of Example 1:

| Example | Cyanoacetate |
|---|---|
| 6 | CNCH₂COO—⌬—OCH₃ |
| 7 | CNCH₂COO—⌬—NHCOCH₃ |
| 8 | CNCH₂COO—[naphthyl] |
| 9 | CNCH₂COO—⌬—Cl |
| 10 | CNCH₂COO—⌬(Cl)(Cl) |

In the following examples α-cyano-N,N-dimethylacetamide is condensed with the following designated acetophenones in the manner of Example 1:

Example:      Acetophenone
11 ____ 3'-allyl, 2'-hydroxy acetophenone.
12 ____ 3'-allyl-4'-hydroxy acetophenone.
13 ____ 3'-allyl-2'-hydroxy-5'-methyl acetophenone.
14 ____ 2'-allyloxy-5'-bromo acetophenone.
15 ____ 3'-bromo-5'-fluoro-2'-hydroxy acetophenone.
16 ____ 3'-bromo-4'-hydroxy acetophenone.
17 ____ 2-bromo-4'-methoxy acetophenone.
18 ____ 2',3'-dimethyl-4'-hydroxy acetophenone.

In the following examples, Example 2 is repeated employing in lieu of 4-hydroxyacetophenone the following butyrophenones:

Example:      Butyrophenone compound
19 ____ 2'-allyloxy butyrophenone.
20 ____ 4'-butoxy-2'-methyl butyrophenone.
21 ____ 3'-bromo-4'-methoxy butyrophenone.
22 ____ 3'-chloro-4'-ethoxy butyrophenone.
23 ____ 2',5'-dimethyl-4'-propoxy butyrophenone.
24 ____ 4'-ethoxy-3'-methyl butyrophenone.
25 ____ 5'-ethyl-2'-hydroxy butyrophenone.
26 ____ 4'-ethyl-2'-hydroxy-6'-methyl butyrophenone.
27 ____ 2'-isopentyloxy-5'-methyl butyrophenone.
28 ____ 2'-methyl-4'-propoxy butyrophenone.
29 ____ 4'-methoxy-3'-phenyl butyrophenone.

Example 4 is repeated employing the following phenone compounds:

Example:      Phenone compound
30 _____ 4'-hydroxy octanophenone.
31 _____ 2'-hydroxy-5'-methyl octanophenone.
32 _____ 4'-hydroxyhexadecaphenone.

Example 33

The compound of Example 2 is polyoxyalkylated with ethylene oxide in the following manner. To protect the phenolic hydroxyl group, the corresponding benzene sulfonate is first prepared as follows:

To 1 mole of the compound of Example 2 dissolved in 4 moles of pyridine maintained at about 5° C., there is slowly added 1.2 moles of benzene sulfonyl chloride over a period of 20 minutes. The mixture is then heated gently at 60° C. for 30 minutes, then allowed to cool to room temperature and drowned in ice water containing sufficient hydrochloric acid to neutralize the pyridine. The water soluble product is isolated and dried. Ethoxylation is then carried out by adding to 1 mole of the above product 1.2% by weight based on the weight of the said product of potassium hydroxide and thereafter 4 moles of ethylene oxide are added while maintaining the mixture in an autoclave at 75° C. The resultant product is then hydrolyzed in 2-N-hydrochloric acid by gentle refluxing for 30 minutes at 75° C. whereby benzenesulfonic acid is split off. The pH is adjusted to a pH of about 5 and sodium chloride is added to the aqueous mass at a temperature of 50° C. until a 30% solution of the salt is present (almost saturated). To the aqueous volume an equal volume of isopropanol is added and the mixture vigorously agitated. The ethoxylated product is preferentially soluble in the isopropanol to the exclusion of benzene sulfonic acid which remains in the salt-water layer (immiscible with isopropanol when so nearly saturated with sodium chloride). The isopropanol is then distilled leaving substantially pure ethoxylated product containing 4 oxyethyl groups per mole of cyanocinnamate.

Example 34

Example 33 is repeated employing:

| | | Moles |
|---|---|---|
| (A) | Ethylene oxide | 5 |
| (B) | Ethylene oxide | 10 |
| (C) | Ethylene oxide | 15 |
| (D) | Ethylene oxide | 30 |
| (E) | Ethylene oxide | 50 |
| (F) | Propylene | 10 |
| (G) | Propylene | 25 |
| (H) | F above plus 10 moles of ethylene oxide. | |

Examples 35–43

In the following examples, 4-n-dodecyloxyacetophenone is condensed with the indicated β-cyano compounds in the manner of Example 1.

Example: α-Cyano compound
35 _____ α-Cyanoacetamide.
36 _____ α-Cyano-N,N-dimethylacetamide.
37 _____ Phenyl α-cyanoacetate.
38 _____ Benzyl α-cyanoacetate.
39 _____ (4-methoxy-phenyl) α-cyanoacetate.
40 _____ (4-acetamido-phenyl) α-cyanoacetate.
41 _____ Naphthyl α-cyanoacetate.
42 _____ (4-chlorophenyl) α-cyanoacetate.
43 _____ (3,4-dichlorophenyl) α-cyanoacetate.

The 4-n-dodecyloxyacetophenone is prepared by the alkylation of 4-hydroxyacetophenone with n-dodecyliodide as follows:

300 mls. of n-butylalcohol and 4.0 g. of sodium hydroxide pellets are mixed There is then added 13.6 g. (0.1 m.) of 4-hydroxyacetophenone. 44.2 g. (0.15 m.) of 1-iodo-n-dodecane is then added. The charge is stirred 15 hours at 68° C., cooled to room temperature and diluted to 1 liter volume with methanol. There is then added 0.6 g. of sodium hydroxide bringing the material so phenolphthalein alkalinity. The 4-n-dodecyloxyacetophenone is then isolated by filtration.

Examples 44–48

4-benzyloxyacetophenone, prepared from benzyliodide and 4-hydroxyacetophenone similarly as the 4-n-dodecyloxyacetophenone is prepared above, is condensed with the following α-cyano compounds as in Example 1:

Example: α-Cyano compound
44 _____ α-Cyanoacetamide.
45 _____ α-Cyano-N,N-dimethylacetamide.
46 _____ Benzyl α-cyanoacetate.
47 _____ Naphthyl α-cyanoacetate.
48 _____ (3,4-dichlorophenyl) α-cyanoacetate.

Example 49

Example 1 is repeated employing 5'-chloro-2'-hydroxycrotonophenone in equivalent amounts.

Example 50

Example 1 is repeated using 4'-methoxy-3-methyl-2-pentenophenone in equivalent amounts.

Example 51

Examples 3, 4 and 6–10 are repeated using the ketone of Example 50.

Example 52

Examples 1 through 4 and 6 through 10 are repeated using as the ketone 2'-hydroxy-4',5'-dimethylpentenophenone.

Example 53

Example 52 is repeated using as the ketone, 2'-methoxy-4-pentenophenone.

Example 54

Example 52 is again repeated employing 2'-methoxyheptenophenone.

Example 55

Example 52 is once more repeated employing 2'-methoxy-2-octenophenone as the ketone.

The following examples will serve to illustrate some applications of the compounds of this invention.

Example A

The product of Example 1 is incorporated into a nitrocellulose lacquer which consists of the following:

20%:
    46 parts of ½ sec. nitrocellulose
    46 parts product of Example 1
    35 parts Cellolyn 502 (non-drying plasticizing alkyd resin of Hercules Powder Company)
    15 parts dibutyl phthalate 80% of a mixture of:
    35 parts butyl acetate
    15 parts butenol
    50 parts toluene This lacquer is drawn out on a metal plate with a Bird film applicator to give a film of 3 mils in thickness. A similar film is prepared wherein the product of Example 1 is replaced by 4 parts of ½ sec. nitrocellulose. The film without the ultra-violet absorber develops a distinct yellow color upon prolonged exposure to light whereas the film containing the absorber shows no change.

Example B 0.5 g. of the product of Example 35 is melted together with 9.5 g. of polyethylene wax (PT 95504) (Semet-Solvay) at 120° C. to give a solution. The material is then pressed out in a Carver Press to give a film of about 0.03 inch thick. Meat stored behind such a film shows less discoloration on exposure to light than meat stored behind a similar film without the absorber.

Example C

To a composition comprising 9 oz. of carnauba wax, 1.5 pints turpentine and 1.75 pints hot water containing 2 oz. of soap there is added 0.45 oz. of the product of Example 1. The whole mixture is beaten with a high speed stirrer and then used to wax a stained and varnished oak surface. Excellent protection to discoloration by light is obtained.

Example D 20 g. of the product of Example 2 is kneaded with 20 g. of Tamol NNO (a formaldehyde-naphthalene-2-sodium sulfonate) in a Werner-Pfleiderer mixer for several hours in the presence of sufficient water to keep the material in a viscous state. The mixture is then evaporated to dryness to give the dispersed form of the absorber. The dispersed absorber is then incorporated into an acrylonitrile butadiene latex (Chemigum 247) employing 5% by weight of absorber based on the weight of the latex. The latex is then sprayed to form a film which shows outstanding resistance to yellowing on exposure to light.

Example E 0.4 g. of the product of Example 4 is added to a cellulose acetate composition comprising 35 g. ethanol, 6.5 g. Methyl Cellosolve, 9.0 g. ethyl acetate and 26 g. of cellulose acetate dope (5 g. cellulose acetate in 21 g. acetone). A film is formed in the usual manner and is found to be of outstanding stability to food materials stored behind it when exposed to ultra-violet light.

Example 56

Example 1 is again repeated using the following phenones:

A. 4'-methoxy-2'-(p-tolyl)acetophenone
B. 4'-methoxy-3-methylsulfonyl acetophenone
C. 4'-methoxy-3'-cyanoethyl acetophenone
D. 4'-methoxy-3'-chloroethyl acetophenone
E. 4'-methoxy-3'-(p-carboethoxyphenyl) acetophenone
F. 4'-methoxy-3'-(p-chlorophenyl) acetophenone
G. 4'-methoxy-3'-(p-bromophenyl) acetophenone
H. 4'-methoxy-3'-(p-cyanophenyl) acetophenone
I. 4'-methoxy-3'-(p-methylsulfonylphenyl) acetophenone
J. 4'-methoxy-3'-methylsulfonyl acetophenone
K. 4'-methoxy-3'-isobutyl sulfonyl acetophenone
L. 4'-methoxy-3'-carbethoxy acetophenone
M. 4'-methoxy-3'-carboisobutoxy acetophenone
N. 4'-methoxy-3'-dodecyl acetophenone
O. 4'-methoxy-3'-eicosyl acetophenone
P. 4'-methoxy-3'-carbophenoxy acetophenone
Q. 4'-methoxy-3'-(p-carbotoloxy) acetophenone
R. 4'-methoxy-3'-(carbo-p-cyanophenoxy) acetophenone
S. 4'-methoxy-3'-(ethyl sulfonyloxy) acetophenone
T. 4'-methoxy-3'-(phenyl sulfonyloxy) acetophenone
U. 4'-methoxy-3'-(acetoxy) acetophenone
V. 4'-methoxy-3'-(butyroxy) acetophenone
W. 4'-methoxy-3'-(benzoyloxy) acetophenone
X. 4'-methoxy-3'-(n-propioxy) acetophenone
Y. 4'-methoxy-3'-(cyano(n-propioxy)) acetophenone
Z. 4'-methoxy-3'-(p-chlorobenzoyloxy) acetophenone
AA. 4'-hydroxy-3'-(methylsulfonyl) octanophenone
BB. 4'-hydroxy-3'-(methylsulfonyl) octenophenone
CC. 4'-hydroxy-3'-(p-cyanophenyl) butyrophenone
DD. 4'-ethoxy-3'-(tetradecyl) pentenophenone
EE. 4'-isopropoxy-3'-(carbophenoxy) heneophenone The compounds of this invention are in general soluble in a great variety of solvents, plastics, resins, waxes and the like, and therefore are particularly adaptable for the stabilization of a great variety of different types of organic materials. The non-oxyalkylated products are insoluble in water. Those compounds which contain smaller amounts of oxyalkyl groups, that is, up to about 4 to 6 groups per molecule, are in general soluble in the more polar organic solvents and fairly readily dispersible in water. The compounds containing larger amounts of alkylene oxide, that is, above about 6 moles per mole of reactive hydrogen containing compound, range from soluble to extremely soluble in water, the solubility increasing as the number of oxyalkyl groups are increased.

The amount of stabilizer to be incorporated is not particularly critical except that sufficient should be present to effect the desired degree of stabilization, and no more should be employed than is necessary to obtain this result. In general, between 0.1% and 10% based on the solids content of the organic material may be used, and preferably between about 0.5% to about 2%. As exemplified above, the ultra-violet observers of this invention can be used not only to stabilize clear films, plastics and the like, but they may be employed in opaque, semi-opaque or translucent materials, the surface of which is susceptible to degradation by ultra-violet light. Among such different types of materials, most of which have been exemplified, are foamed plastics, opaque films and coatings, opaque papers, translucent and opaque fibers, transparent and opaque colored plastics, fluorescent pigments, polishes, creams, lotions and the like whether opaque, clear, or translucent. The compounds of this invention give outstanding protection to paint, enamel and varnish films against fading of pigments and dyes contained therein. The most outstanding and significant achievement of the compounds of this invention lies in the remarkable ability of these compounds to protect and stabilize polyoxymethylene and nitrocellulose containing compositions against ultra-violet light degradation. The compounds of this invention have been found to be at least five times as effective in such stabilizing situations as the heretofore employed hydroxybenzophenones known for such uses.

The compounds of the present invention have also been found to be admirably suited for incorporation into the transparent backings of the various pressure sensitive type adhesive tapes presently in common use. By the employment of these compounds in such a manner, the adhesive nature of the pressure sensitive adhesive is remarkably preserved. Not only may the compounds be incorporated directly into the backing, but they may be used as an overcoating in a transparent or translucent film coating base employing as the film former, any suitable material which will adhere to the tape back. Thus in the case of a regenerated cellulose tape, one may coat the back thereof with one of the cellulosic lacquers hereinbefore described in Example A. For direct incorporation into a film of regenerated cellulose, one may employ any of the compounds herein disclosed, and particularly those which have been polyoxyalkylated as described, for example, in Example 34C. In this instance, it is preferred to impregnate the regenerated cellulose in the gel state before final drying thereof.

Other variations in and modifications of the described processes which will be obvious to those skilled in the art can be made in this invention without departing from the scope or spirit thereof.

We claim:

1. An essentially colorless compound of the formula:

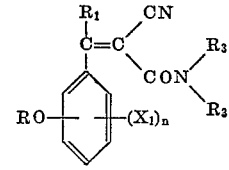

wherein R is selected from the group consisting of hydrogen, alkyl of 1 to 30 carbon atoms, alkenyl of 3 to 30 carbon atoms, and aryl radicals containing not more than three rings, $R_1$ is selected from the group consisting of alkyl radicals of 1 to 30 carbon atoms and alkenyl radicals of 3 to 30 carbon atoms, $X_1$ is a nonauxochromic group having a bathochromism of less than 250 A., $n$ is an integer from 0 to 4 and the $R_3$ is selected similarly as R.

2. A compound as defined in claim 1 wherein R is an alkyl radical, $R_1$ is alkyl and $R_3$ is selected from the group consisting of hydrogen, alkyl, alkenyl, and aryl radicals.

3. A compound as defined in claim 1 wherein R is an alkyl radical, $R_1$ is alkenyl and $R_3$ is selected from the group consisting of hydrogen, alkyl, alkenyl and aryl radicals.

4. A compound as defined in claim 1 wherein R is hydrogen, $R_1$ is alkyl and $R_3$ is selected from the group consisting of hydrogen, alkyl, alkenyl and aryl radicals.

5. A compound as defined in claim 4 wherein $R_3$ is hydrogen.

6. A compound as defined in claim 4 wherein $R_3$ is alkyl.

7. A compound as defined in claim 1 wherein R is an aryl radical, $R_1$ is alkyl and wherein $R_3$ is selected from the group consisting of hydrogen, alkyl, alkenyl and aryl radicals.

8. A compound as defined in claim 1 wherein R is an aryl radical, $R_1$ is alkenyl and wherein $R_3$ is selected from the group consisting of hydrogen, alkyl, alkenyl and aryl radicals.

9. $\alpha$ - Cyano - $\beta$ - methyl - 4 - n - dodecyloxy cinnamic acid amide.

References Cited
UNITED STATES PATENTS

| | | | |
|---|---|---|---|
| 3,180,885 | 4/1965 | Nentwig et al. | 260—465 |
| 3,244,668 | 4/1966 | Knapp et al. | 260—45.85 |
| 3,278,448 | 10/1966 | Lauerer et al. | 260—45.85 X |

CHARLES B. PARKER, Primary Examiner

DOLPH H. TORRENCE, Assistant Examiner

U.S. Cl. X.R.

99—154, 157 163, 164; 106—10, 168, 186, 195, 196; 117—122, 138.5, 144, 147, 154; 252—300; 260—45.9, 45.85, 465.4, 592, 820